Patented Aug. 9, 1949

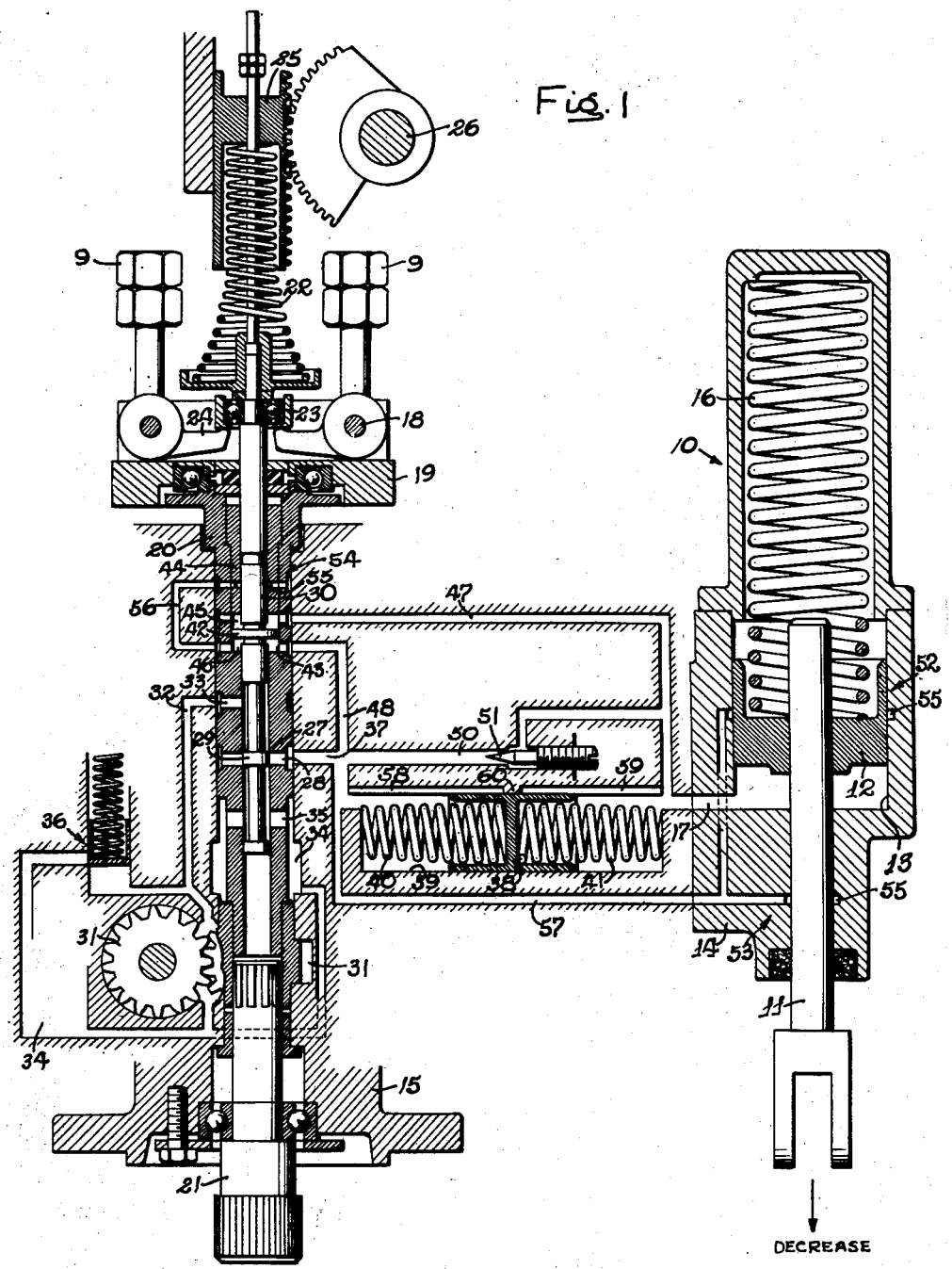

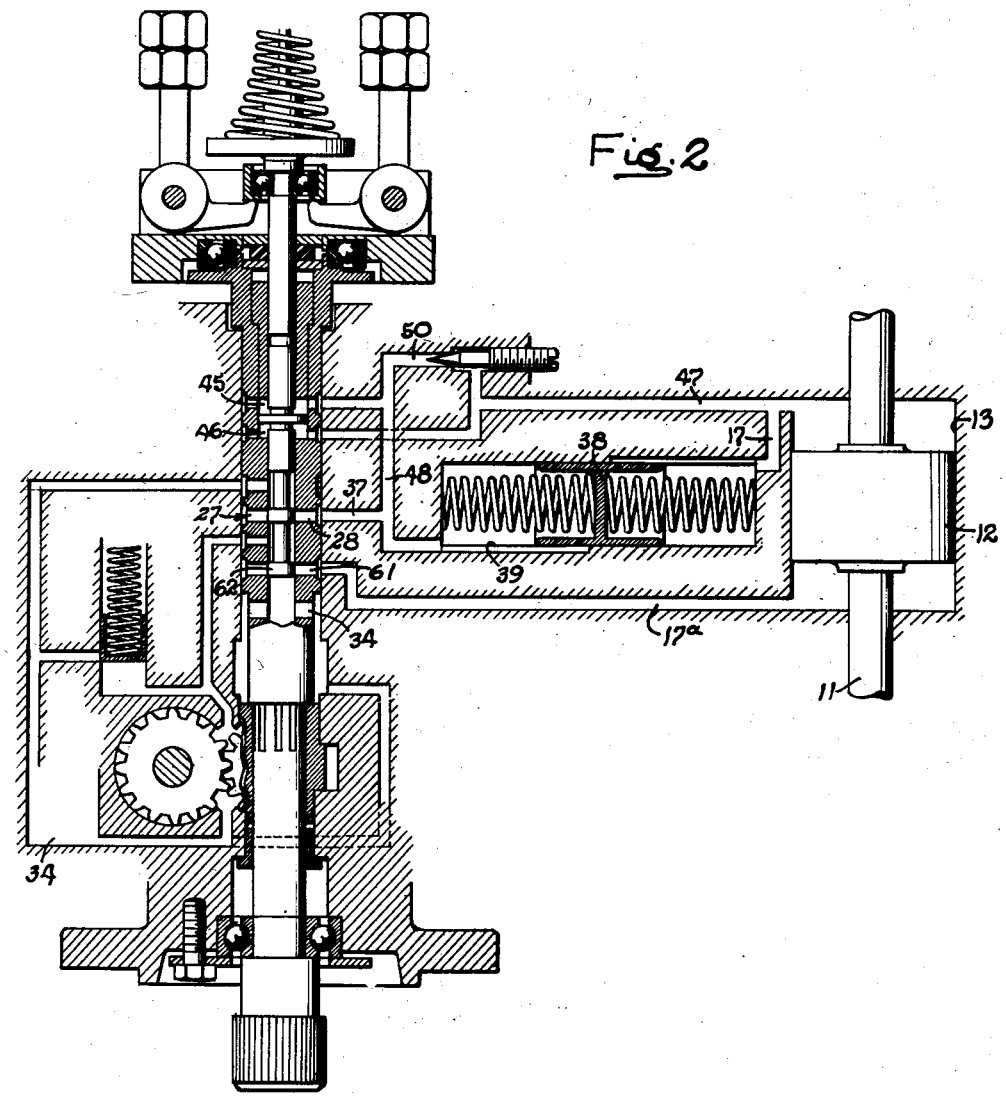

2,478,753

UNITED STATES PATENT OFFICE 2,478,753

CONDITION REGULATING APPARATUS

George E. Parker, Rockford, Ill., assignor to Woodward Governor Company, Rockford, Ill., a corporation of Illinois Application May 4, 1946, Serial No. 667,368

14 Claims. (Cl. 121—42)

This invention relates to apparatus for controlling the operation of a servo or power actuator in accordance with variations in a control force produced by deviations of a condition to be controlled from a desired value which is restored to such value by introducing a so-called compensating effect.

The general object is to provide a fluid actuated compensating mechanism which is not affected by external pressure changes, which is substantially simpler in construction than prior mechanisms of the same general type, and which is less sensitive to variations in fluid viscosity, etc.

Another object is to derive the compensating force in a novel manner through the action of a resilient device which is also used to effect gradual dissipation of the compensating force.

A more detailed object is to provide a hydraulic control in which a condition-responsive control valve and servo are separated from each other by a yieldably movable wall to derive a pressure differential which provides the compensating or restoring force.

Still another object is to provide a hydraulic servo having means for producing a fluid pressure differential on the outlet side of the control valve which differential is utilized as the source of compensating force.

A further object is to provide a hydraulic compensating system having a novel means for sealing the movable parts against escape of the compensating fluid.

Other objects and advantages of the invention will become apparent from the following detailed description taken in connection with the accompanying drawings, in which Figure 1 is a fragmentary sectional view and hydraulic circuit diagram of a control apparatus embodying the present invention.

Fig. 2 is a similar view of a modification.

For purposes of illustration, the improved compensating mechanism is shown in the drawings incorporated in apparatus of the hydraulic type in which a control force, variable in direction and magnitude with changes in the physical, chemical or electrical condition, such, for example, as the speed of a prime mover, governs the operation of a servo actuator 10 for positioning a rod 11 connected to a regulator, such as the throttle of a prime mover, by which changes in the condition may be made. In the form shown in Fig. 1, the servo motor is of the single acting hydraulic type comprising a piston 12 reciprocable in a stationary cylinder 13 which may, as shown, be supported within a housing 14 attached to the lower end of the casing 15 of the governor proper. The regulator rod 11 is urged in the speed-decreasing direction by a compression spring 16. Fluid under pressure is introduced into or withdrawn from the head end of the cylinder 13 through a passage 17 to control the energization of the servo and therefore the position of the regulator rod.

Various types of means may be employed to detect deviations of the controlled condition or speed from the value desired to be maintained. The exemplary detecting means herein shown comprises upstanding weights 9 pivoted at 18 on a head 19 which is fast on the upper end of a ported sleeve 20 rotatable in a bushing which is supported in the casing 15. The lower end of the sleeve 20 is spline coupled to a shaft 21 driven by the prime mover which is controlled by the governor.

The centrifugal force acting on the flyballs is balanced against a compression spring 22 bearing downwardly against the inner race of a ball thrust bearing 23 whose outer race is engaged by arms 24 of the flyballs. The speed-setting of the governor may be adjusted by manually turning a shaft 26 to shift a member 25 and thereby vary the speeder spring stress.

The control force derived from changes in the flyball speed is applied mechanically to a device having parts which are relatively movable in opposite directions away from a predetermined neutral position in response to opposite deviations of the control force away from a value predetermined by the governor speed adjustment. Herein, this control device takes the form of a pilot valve 27 formed by ports 28 in the sleeve 20 coacting with a land 29 on a stem 30 which is slidable in the rotating sleeve and is connected at its upper end to the inner race of the bearing 23.

Fluid at a substantially constant super-atmospheric pressure, for example, 150 pounds per square inch, is supplied by a pump including gears 31, one of which is coupled to the lower end of the sleeve 20. Through a passage 32 and a port 33 in the sleeve 20, oil supplied under pressure by the pump is delivered into the sleeve above the land 29. The pump inlet communicates with sump spaces 34, one of which is connected through holes 35 with the interior of the sleeve 20 below the land 29. The pressure delivered by the pump is maintained approximately constant by a spring loaded valve 36 which bypasses fluid to the sump when the supply line pressure exceeds a predetermined value.

Pressure fluctuations in the space 37 to which fluid is delivered or from which it is released when the valve is open are communicated to the servo cylinder 13 through the intermediary of means which, in accordance with the present invention, is constructed to produce a fluid pressure differential in response to each valve movement following the detection of a condition change which differential is proportional in magnitude to the servo piston movement and may be utilized in producing the compensating action. While the differential producing means may take various forms, it includes, in the present instance, a wall in the form of a piston 38 in a cylinder 39, the two being yieldably urged in opposite directions and relatively movable in response to pressure changes in the space 37 and the servo cylinder 13. Herein, the piston is the movable one of these elements, the cylinder having one end in constant communication with the valve passage 37 and the other end connected to the passage 17 leading to the servo cylinder. The piston has equal effective areas at opposite ends and is yieldably urged in opposite directions so as to be maintained in a centered or neutral position when the pressures in the passages 17 and 37 become equalized. In this instance, two springs 40 and 41, under some initial compression, are provided and arranged to act in compression between the piston and opposite end walls of the cylinder 39.

With this arrangement, it will be apparent that when the land 29, in response to a speed decrease below the prevailing speed setting of the governor, is lowered from its neutral position opening the ports 28, fluid from the supply line 32 will flow into the passage 37 and the connected end of the cylinder 39. The pressure increase therein will move the piston to the right, overcoming and compressing the spring 41 and forcing fluid out of the other cylinder end through the passage 17 and into the servo cylinder 13. The servo piston 12 is thus moved in the speed-increasing direction against its spring 16 and other forces opposing movement of the rod 11. The fuel supply and therefore the engine speed are thus changed to counteract the detected speed decrease. As a result of the displacement of the piston 38, the pressures in the cylinder 39 at the two opposite sides of the wall 38 will differ from each other by an amount determined by the area of the piston and the difference between the loads on the springs 40 and 41 at the new position of the piston.

In operation of the governor, a detected rise in speed causes the valve land 29 to be raised above the valve ports 28. This allows fluid to escape to the sump 34 from the passage 37 thereby decreasing the pressure in the latter. Such pressure reduction allows the plunger 38 to move under the higher pressure existing in the servo cylinder 13 thereby compressing the spring 40 and allowing the servo piston to move under the action of its spring in the speed-decreasing direction. Again there is created a differential between the pressures in the servo cylinder and the valve passage 37, the former being greater than the latter by an amount determined by the area of the piston 38 and the loading of the springs 40 and 41 at the new piston position.

It will be apparent from the foregoing that during normal operation of the speed controller, super-atmospheric pressures are maintained at all times in the servo cylinder 13 and in the valve outlet passage 37 and that in response to any speed change, there is a pressure difference between these two spaces, the differentials being in opposite senses dependent on whether the speed rises above or falls below the governor setting. The present invention utilizes these pressures differentials to produce a so-called compensating action, that is, derive a force acting on the valve elements in the direction of their neutral position whereby to produce a stabilizing effect on the control system through a drooping characteristic which is then dissipated gradually until normal speed has been restored under the changed load.

The modifying force may be applied to either element of the control device 27 by providing on such element oppositely facing pressure areas respectively subjected to the pressures in the valve space 37 and the servo passage 17. Preferably, though not necessarily, the pressure areas are separated from the cylinder 39 above referred to and herein are formed by opposite sides of a movable wall in the form of a piston 42 secured to the valve stem 30 above the valve structure. The piston is slidable in a cylinder 43 formed within the rotating sleeve 20 and closed on its upper end by a bushing 44 so as to form a chamber 45 above the piston and a chamber 46 of similar size below the piston, the opposite ends of the piston having equal effective pressure areas so that the fluid operator by which the modifying force is applied will be equally effective in opposite directions.

To exert the pressure differentials above referred to on the piston 42 and in the proper direction, the upper chamber 45 is connected by a passage 47 to the passage 17 that leads to the servo cylinder 13. The valve outlet passage 37 is directly connected to the lower chamber 46 through a passage 48. As a result of these connections, the piston 42 and the stem 30 will receive a resultant upwardly directed force following downward movement of the valve stem in response to the detection of a speed decrease. As described above, this force is due to the predominance in the pressure change in the passage 37 and the lower chamber 46 over that in the servo cylinder 13 and in the upper chamber 45. Conversely, when fluid is released from the passage 37 in response to a speed increase, the pressure in both chambers 45 and 46 changes, but that in the upper chamber predominates resulting in the application of a downward force on the receiving piston 42.

In each case, the modifying force on the piston 42 urges the valve stem in a direction opposite to its movement which produced the pressure differential, thereby producing the desired drooping characteristic. The restoring force is derived directly from the pressure differential which results from the motion of the servo piston 12 and will be proportional to the movements of the spring loaded piston 38.

If the restoring force on the valve were allowed to persist, the control system would have a drooping characteristic, the condition maintained by the servo actuated regulator then varying in proportion to load changes. To avoid this and restore the condition to the desired equilibrium value, means is provided for decreasing the return force progressively by dissipating the pressure differential which produces it. This is accomplished by interposing a connection 50 between the passages 47 and 48 which connection has restrictions therein the size of which is determined by a needle valve 51 which may be adjusted to vary the rate of fluid leakage between the servo cylinder 13 and the valve outlet passage 37.

It will be observed that under equilibrium conditions, the compensating chambers 45 and 46 are at a super-atmospheric pressure. Therefore, any leakage out of the chamber 45 and the fluid filled spaces connected therewith would have to be made up by flow through the needle valve 51 which requires a pressure differential which is imposed on the piston 42. Such detrimental leakage is avoided herein by providing effective seals at the points along the possible paths of escape of fluid to low pressure spaces, and this without offering frictional resistance to movement of the parts. In the present instance, this is accomplished by providing hydraulic seals 52, 53, and 54 around the servo piston 12, the rod 11 thereof, and around the upper end of the valve stem 30 and the rotating bushing 20. Each seal comprises an annular groove 55 in the stationary one of the coacting guide or bearing surfaces, this groove being supplied with fluid at a pressure which, under equilibrium conditions, is substantially equal to that in the chamber from which fluid might otherwise escape. The passage 37 and the chamber 46 connected therewith are utilized as the source of sealing pressure fluid and are connected by passages 56 and 57 to the grooves 55 of the different seals. Thus, under equilibrium conditions, the seal grooves will be maintained at the same pressure as that existing in the chamber 45 and, as a consequence, leakage from the latter is prevented. In the case of the servo, various other types of seals, such as rubber rings, may be used.

The spring actuated buffer piston 38 may be utilized as a by-pass valve for limiting the extent of build-up of the compensating force on the piston 42. To this end, longitudinal grooves 58 and 59 are formed in opposite end portions of the cylinder 39 with their adjacent ends separated by a land 60 which is substantially shorter than the piston 38. As the piston moves from its centered position a distance predetermined by the lengths of the piston and the land, the latter will be uncovered and fluid will be permitted to by-pass from one end of the cylinder 39 through the groove in the other end, the valve outlet passage 37 being then connected directly to the servo cylinder 13. A further increase in the pressure differential between the chambers 45 and 46 is thus prevented and, in response to wider condition changes, fluid flows to or from the servo cylinder directly.

For any given degree of opening of the needle valve 51, the magnitude of the restoring force for a given amount and rate of servo movement will be determined by several factors including the area of the pistons 12, 38, and 42, and the scale of the springs 40 and 41. These factors are, of course, correlated with each other to produce the desired compensating action. For example, the areas of the pistons 12, 38, and 42 may be 3, .78, and .2 square inches respectively while the springs 40 and 41 have a scale of from 3 to 10 pounds per inch depending on the characteristics of the engine controlled by the governor.

The operation of the compensating mechanism above described may be summarized as follows, assuming that the controlled prime mover is operating at the speed for which the governor is set, the parts then being in the equilibrium positions shown in Fig. 1. If the load on the prime mover is increased and the speed thereby decreased, the flyballs will move in, allowing the speeder spring 22 to move the control land 29 downwardly to uncover the ports 28 and permit a flow of pressure fluid to the passage 37 and the left end of the cylinder 39, forcing the piston 38 to the right against the action of the spring 41. Fluid is thus forced out of the other end of the cylinder and into the servo cylinder 13, and the prime mover regulator is moved to correct for the speed decrease.

As an incident to this, the pressure in the lower chamber 46 is increased above that in the upper chamber 45 by an amount proportional to the movement of the piston 38, resulting in the application to the receiving piston 42 of an upwardly directed restoring force. The drooping characteristic thus produced is maintained by the action of the spring 41 on the piston 38 but starts to dissipate immediately by fluid leakage through the restricted by-pass 51 between the chambers 45 and 46. As the pressure differential decreases, the speed at which a given valve opening is maintained is brought closer to the normal speed setting of the governor, until the normal speed has been restored fully when the pressure differential has been dissipated and the piston 38 returned to balanced position, the system then being in equilibrium.

If the load decreases resulting in a speed increase, the valve land 29 is raised by the flyballs and the energization of the servo is reduced as above described by movement of the piston 38 to the left against the action of the spring 40. A pressure differential is thus created between the chambers 45 and 46 resulting in a force applied to the receiving piston 42 in a downward direction. As before, the droop thus produced is dissipated by the leakage through the needle valve, the normal speed of the prime mover being restored when equilibrium again obtains with the return of the buffer piston 38 to balanced position.

The compensating mechanism described above possesses numerous advantages. The chambers 45 and 46 are maintained under super-atmospheric pressure at all times so that the mechanism is unaffected by external pressure changes. By separating the servo cylinder and the control valve by the movable wall 38 spring urged in opposite directions, the buffer mechanism thus formed not only performs the function of dissipating the droop by causing continuous leakage through the needle valve 51 but also functions to derive the compensating force by creating a pressure differential as an incident to each change in servo position. Thus, this force is derived within the governor structure itself thereby obviating the necessity of extending additional hydraulic connections between the governor and the servo and enabling the latter to be located conveniently at a point remote from the governor.

In addition to being derived hydraulically, the modifying or compensating force is also applied to the control device or valve 27 by hydraulic action thereby eliminating the effect of friction in the complete dissipation of the compensating force.

Since a relatively large volume of fluid must leak through the valve 51 as an incident to restoration of equilibrium conditions, the adjustment of the needle valve is less delicate and the system as a whole is less susceptible to changes in fluid viscosity.

Fig. 2 illustrates the application of the improved compensating mechanism to a so-called double acting servo, the parts common to the form shown in Fig. 1 being correspondingly numbered. The servo piston 12 and the regulator rod 11 are moved in opposite directions by the flow of fluid through passages 17 and 17ª into opposite ends of the cylinder 13. The passage 17ª leads directly to ports 61 in the pilot valve 27 while, as before, the valve ports 28 are connected to the passage 37 leading to one end of the buffer cylinder 39, the opposite end of which communicates with the passage 17 and through the passage 47 to the lower chamber 46 of the compensating mechanism. The upper chamber 45 is connected to the passage 37 through the channel 48, and the passages 47 and 48 are connected through the needle valve controlled passage 50.

The pilot valve 27 comprises two lands 29 and 62 respectively covering the ports 28 and 61 in the rotating sleeve 20. Pressure fluid is supplied through the channel 32 to the sleeve between the two lands, and the sleeve beyond the lands communicates with sump passages 34.

The operation of this modification is the same as that of the form first described except that the servo connected passage 17ª is connected to the sump in response to a speed increase to permit downward displacement of the servo piston by fluid forced into the upper end of the servo cylinder by movement of the buffer piston 38. When the valve stem is lowered in response to a speed decrease connecting the passage 37 to the sump, the supply line 32 is connected simultaneously to the passage 17ª and the servo cylinder to raise the piston 12. The action of the circuits in applying the compensating force to the receiving piston 42 and in dissipating this force is the same as described above.

I claim as my invention:

1. Regulating apparatus for energizing a fluid servo actuator having, in combination, a fluid filled space, a valve having parts relatively movable in opposite directions away from a normal neutral position in response to opposite deviations of a control force from a predetermined value, said valve admitting pressure fluid to said space or releasing fluid therefrom according to the deviation of said control force, a wall movable with one valve part, means coacting with opposite sides of said wall to define closed fluid filled chambers, means connecting said fluid space directly to one of said chambers to produce on said wall a force counteracting each control force deviation, a passage directly communicating with said other chamber and adapted for connection with said fluid servo actuator to vary the pressure in the latter chamber in accordance with the energization of the actuator, a second movable wall separating said space and said passage and having fluid filled chambers on opposite sides thereof, one communicating with said space and the other with said passage, spring means yieldably urging said second wall in opposite directions toward equilibrium position, and means establishing continuous restricted communication between said space and said passage.

2. Regulating apparatus for energizing a fluid servo actuator having, in combination, a fluid filled space, a fluid passage adapted for connection with said servo actuator, a movable wall separating said passage and said space and yieldably movable in opposite directions from a normal equilibrium position, a control device operable in response to opposite deviations of a condition from a predetermined value to respectively increase and decrease the pressure in said space and thereby produce a pressure differential between the space and said passage, a fluid operator for applying a modifying force to said control device, fluid connections joining said fluid operator with said passage and space for applying said differential to said fluid operator and control device in a direction to urge said control device toward a neutral position, and means providing a slow leakage connection between said passage and said space.

3. Regulating apparatus for energizing a fluid servo actuator having, in combination, a fluid filled space, a fluid passage adapted for connection with said servo actuator, a movable wall separating said passage and said space and yieldably movable in opposite directions from a normal equilibrium position, a control device operable in response to opposite deviations of a condition from a predetermined value to respectively increase and decrease the pressure in said space and thereby produce a pressure differential between the space and said passage, a fluid operator for applying a modifying force to said control device, fluid connections joining said fluid operator with said passage and space for applying said differential to said fluid operator and control device in a direction to urge said control device toward a neutral position, means providing a slow leakage connection between said passage and said space, and means for by-passing fluid between said space and said passage in response to a predetermined movement of said wall in either direction away from said equilibrium position.

4. Regulating apparatus for energizing a fluid servo actuator having, in combination, a fluid filled cylinder, a piston reciprocable therein and yieldably urged in opposite directions toward a centered position, said piston separating opposite ends of the cylinder, a control element movable in opposite directions in response to corresponding changes in a condition to be controlled, a wall movable with said element, means providing fluid filled chambers on opposite sides of said wall respectively communicating with opposite ends of said cylinder, means providing a secondary fluid connection between said opposite cylinder ends permitting the restricted flow of fluid therebetween, a control device actuated by said element and operable selectively to admit fluid to or release the same from one of said cylinder ends in response to detected condition changes, and a servo supply passage leading from the other of said cylinder ends and adapted for connection with said servo actuator.

5. Regulating apparatus having, in combination, a control device movable in opposite directions away from a normal neutral position, a wall movable with a part of said control device and having opposite effective pressure areas, means coacting with the respective pressure areas to define closed fluid filled chambers, fluid pressure actuated means operable selectively according to the direction of displacement of the control device out of said neutral position to change the pressures in both of said chambers differentially and produce a resultant pressure differential acting to urge said device toward the neutral position, a fluid servo actuator energized selectively in accordance with fluid pressure changes in said fluid pressure actuated means, and means establishing continuous restricted communication between said chambers for effecting gradual dissipation of said pressure differentials and equalizing the pressures in the chambers.

6. Regulating apparatus having, in combination, a fluid filled space, a valve having parts relatively movable in opposite directions away from a normal neutral position to admit pressure fluid to said space or release fluid therefrom according to the direction of such movement, a member movable with one valve part and providing oppositely facing pressure areas, means coacting with said opposite areas to define closed fluid filled chambers, means connecting said fluid space directly to one of said chambers to produce on one of said areas a force acting in a direction reverse to the previous valve motion, fluid pressure actuated means directly energized from said space and operable to maintain super-atmospheric pressures in both of said chambers while varying said pressures to produce a drooping characteristic in response to each deviation of said control force, a fluid servo actuator energized selectively in accordance with fluid pressure changes in said fluid pressure actuated means, and means providing a separate fluid connection between said chambers for effecting gradual dissipation of said drooping characteristic.

7. Regulating apparatus for regulating a fluid servo actuator having, in combination, a fluid filled space, a fluid filled passage adapted for connection with said servo actuator, a movable fluid separating wall between said space and passage, a control device operable in response to opposite deviations of a condition from a predetermined value to respectively increase and decrease the pressure in said space, means operable in response to changes in the pressure in said space produced by a condition change to also change the pressure in said passage in the same direction and produce a resultant pressure differential between said space and said passage, fluid pressure actuated means energized by said pressure differential and operable to apply a corresponding force to said control device for imparting a drooping characteristic thereto, and means for effecting slow dissipation of said drooping characteristic.

8. Regulating apparatus for variably energizing a fluid servo actuator having, in combination, a fluid filled space, a valve having parts relatively movable in opposite directions away from a normal neutral position in response to opposite deviations of a control force from a predetermined value, said valve admitting pressure fluid to said space or releasing fluid therefrom according to the deviation of said control force, a wall movable with one valve part, means coacting with opposite sides of said wall to define closed fluid filled chambers, means connecting said fluid space directly to one of said chambers to produce on said wall a force counteracting each control force deviation, a passage directly communicating with said other chamber and adapted for connection with said fluid servo actuator to vary the energization of the latter, means including a movable wall separating said fluid space and said passage and operable in response to each pressure change in said space to produce a pressure differential and effect a corresponding displacement of fluid into or out of said servo passage, said last mentioned means including a means yieldably resisting movement of said last mentioned wall, and means establishing continuous restricted communication between said chambers to effect gradual dissipation of said pressure differential.

9. Regulating apparatus having, in combination, means providing a fluid filled space, a valve having parts relatively movable in opposite directions away from a normal neutral position in response to opposite deviations of a control force from a predetermined value, said valve admitting pressure fluid to said space or releasing fluid therefrom according to the deviation of said control force, a wall movable with one valve part, means coacting with opposite sides of said wall to define closed fluid filled chambers, one of said chambers communicating with said fluid space, an actuator piston, a cylinder enclosing said piston and communicating at one end with the other of said chambers, a second cylinder communicating at opposite ends with said space and said first cylinder, a piston in said second cylinder yieldably urged in opposite directions toward a centered position, and means establishing continuous restricted communication between said chambers to effect gradual dissipation of the pressure differentials created therebetween in response to operation of said valve.

10. Regulating apparatus, having, in combination, a fluid pressure actuator including a fluid filled chamber and a piston movable in response to pressure changes in said chamber, means providing a fluid filled space separated from said chamber by a movable wall, means yieldably urging said wall in opposite directions, a control device operable in response to opposite deviations of a condition to respectively increase and decrease the pressure in said space, a second fluid pressure actuator for applying a compensating force to said control device, means providing fluid connections between said second actuator and said space and chamber to energize the actuator in accordance with the pressure differential between the space and chamber, and means providing a continuous restricted fluid connection between said space and said chamber.

11. Regulating apparatus having, in combination, a piston, means including a cylinder guiding said piston and cooperating with one end thereof to define a closed fluid filled chamber, a fluid filled space, a valve responsive to changes in a control force to admit or release pressure fluid from said space to maintain superatmospheric pressure therein, a second cylinder communicating at opposite ends with said space and said chamber, a piston in said second cylinder yieldably urged in opposite directions, means providing an annular sealing groove around the piston guide surface of said first cylinder, compensating mechanism operable to apply the pressure differential between opposite ends of said second cylinder to a part of said valve in a direction opposite to the control force producing such differential including a restricted leakage connection between opposite ends of said second cylinder, and means providing a fluid filled passage connecting said space and said groove.

12. Regulating apparatus having, in combination, a servo piston, means providing a cylinder guiding said piston and cooperating with one end of the piston to provide a closed fluid filled chamber, a fluid filled space, a valve responsive to changes in a control force to admit or release pressure fluid from said space to maintain superatmospheric pressure therein, a second cylinder communicating at opposite ends with said space and said chamber, a piston in said second cylinder yieldably urged in opposite directions, mechanism responsive to a fluid pressure differential between opposite ends of said second cylinder to apply a restoring force to a part of said valve including a restricted leakage connection between opposite ends of said second cylinder, and means for sealing said chamber against the escape of pressure fluid from said servo chamber including a fluid connection communicating at one end with said valve controlled space and terminating at the other end between the coacting guide surfaces of said servo piston and cylinder to create a fluid pressure between such surfaces opposing the pressure within said chamber.

13. Regulating apparatus for regulating a fluid servo actuator having, in combination, a fluid filled space, a valve controlling the flow of pressure fluid to and from said space and having coacting parts relatively movable in opposite directions away from a neutral position in response to opposite deviations of a control force from a predetermined value, a fluid passage adapted to be connected to said fluid servo actuator, a cylinder communicating at opposite ends with said space and said passage respectively, a piston within said cylinder separating said passage and said space, said piston and said cylinder being mounted for relative axial movement, spring means acting between said cylinder and said piston and urging the two in opposite directions toward a centered position, two oppositely facing areas of equal size movable with one of said valve parts, one area being subjected to pressure changes in one end of said cylinder and the other being subjected to the fluid pressure in the other end of the cylinder whereby said areas respond to the pressure differential between said space and passage to urge said valve parts toward said neutral position, and means establishing a continuous restricted fluid connection between opposite ends of said cylinder for effecting dissipation of the pressure differentials created between said space and said passage.

14. Regulating apparatus for energizing a fluid servo actuator having, in combination, a fluid filled space, a valve controlling the flow of pressure fluid to and from said space and having coacting parts relatively movable in opposite directions in response to opposite changes in a control force, a fluid passage adapted to be connected to said fluid servo actuator, a wall, means cooperating with opposite sides of said wall to define fluid chambers communicating with said space and passage respectively, said last mentioned means and said wall being mounted for relative axial movement, spring means acting to urge said wall and chamber defining means in opposite directions toward a centered position, said chambers having oppositely facing areas of equal size movable with one of said valve parts and acted on by the fluid pressure differential between the chambers to urge the valve parts toward said neutral position, and a fluid connection establishing continuous restricted communication between said chambers for effecting dissipation of the pressure dicerential created between said space and said passage by actuation of said valve in response to a change in the control force.

GEORGE E. PARKER.

REFERENCES CITED

The following references are of record in the file of this patent:

UNITED STATES PATENTS

| Number | Name | Date |
|---|---|---|
| 639,744 | Leavitt | Dec. 26, 1899 |
| 2,179,696 | Keel | Nov. 14, 1939 |
| 2,341,384 | Kalin | Feb. 8, 1944 |
| 2,364,817 | Reggio | Dec. 12, 1944 |
| 2,367,009 | Davis | Jan. 9, 1945 |
| 2,402,065 | Martin | June 11, 1946 |